US010432250B2

(12) United States Patent
Ju et al.

(10) Patent No.: US 10,432,250 B2
(45) Date of Patent: Oct. 1, 2019

(54) METHOD FOR CANCELLING SELF-INTERFERENCE OF IN-BAND FULL-DUPLEX MULTIPLE-INPUT MULTIPLE-OUTPUT WIRELESS COMMUNICATION

(71) Applicant: Electronics and Telecommunications Research Institute, Daejeon (KR)

(72) Inventors: Hyung Sik Ju, Hwaseong-si (KR); Dong Hyuk Gwak, Daejeon (KR); Seon Ae Kim, Daejeon (KR); Yu Ro Lee, Daejeon (KR); Hyun Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 27 days.

(21) Appl. No.: 15/697,592

(22) Filed: Sep. 7, 2017

(65) Prior Publication Data

US 2018/0076847 A1 Mar. 15, 2018

(30) Foreign Application Priority Data

Sep. 13, 2016 (KR) .................. 10-2016-0118404
Aug. 25, 2017 (KR) .................. 10-2017-0107901

(51) Int. Cl.
| H04B 1/525 | (2015.01) |
| H04B 7/0413 | (2017.01) |
| H04L 5/16 | (2006.01) |
| H04L 5/00 | (2006.01) |

(52) U.S. Cl.
CPC .......... *H04B 1/525* (2013.01); *H04B 7/0413* (2013.01); *H04L 5/0023* (2013.01); *H04L 5/16* (2013.01)

(58) Field of Classification Search
CPC .......... H04B 1/525; H04B 7/0413; H04L 5/14
See application file for complete search history.

(56) References Cited

U.S. PATENT DOCUMENTS

| 7,242,725 | B2 | 7/2007 | Matsumoto et al. | |
| 8,498,369 | B2 | 7/2013 | Forrester et al. | |
| 9,209,840 | B2 * | 12/2015 | Cox ................... | H04B 1/525 |
| 9,887,862 | B2 * | 2/2018 | Zhou .................. | H04L 25/08 |
| 10,050,663 | B1 * | 8/2018 | Ku ..................... | H04B 1/525 |
| 10,177,896 | B2 * | 1/2019 | Khandani ............ | H04B 17/14 |
| 2002/0060827 | A1 | 5/2002 | Agazzi | |
| 2003/0016741 | A1 | 1/2003 | Sasson et al. | |
| 2008/0187035 | A1 | 8/2008 | Nakamura et al. | |
| 2009/0051458 | A1 | 2/2009 | Miller et al. | |
| 2009/0094304 | A1 | 4/2009 | Batruni | |

(Continued)

*Primary Examiner* — Devan A Sandiford
(74) *Attorney, Agent, or Firm* — Rabin & Berdo, P.C.

(57) ABSTRACT

An operation method of an in-band full duplex (IFD) multiple-input multiple-output (MIMO) transceiver, including a reception part, a transmission part, an analog self-interference (SI) generator, and a self-interference cancellation (SIC) controller, may comprise generating, at the SIC controller, a control signal for analog SIC and digital SIC and outputting the control signal to the reception part and the analog SI generator; cancelling, at the SIC controller, SI of a transmission signal of the transmission part based on the control signal; and cancelling, at the reception part, SI of a signal of the reception part based on the control signal.

7 Claims, 13 Drawing Sheets

(56) References Cited

U.S. PATENT DOCUMENTS

| | | | |
|---|---|---|---|
| 2009/0316826 A1 | 12/2009 | Koren et al. | |
| 2012/0201173 A1* | 8/2012 | Jain | H04B 1/525 370/277 |
| 2013/0301487 A1* | 11/2013 | Khandani | H04W 16/14 370/278 |
| 2015/0049834 A1* | 2/2015 | Choi | H04B 1/525 375/285 |
| 2015/0131757 A1 | 5/2015 | Carbone et al. | |
| 2015/0236750 A1* | 8/2015 | Choi | H04B 1/525 370/278 |
| 2015/0280887 A1* | 10/2015 | Ko | H04B 1/525 370/330 |
| 2015/0311985 A1* | 10/2015 | Kim | H04B 15/00 455/501 |
| 2016/0149691 A1* | 5/2016 | Chang | H04L 5/1461 370/276 |
| 2016/0218769 A1* | 7/2016 | Chang | H04B 1/525 |
| 2016/0226535 A1* | 8/2016 | Choi | H04B 1/525 |
| 2016/0226653 A1* | 8/2016 | Bharadia | H04B 1/525 |
| 2016/0352386 A1 | 12/2016 | Mirzaei et al. | |
| 2016/0373234 A1* | 12/2016 | Ju | H04L 5/14 |
| 2018/0006794 A1* | 1/2018 | Lee | H04L 5/14 |
| 2018/0013466 A1* | 1/2018 | Kim | H04B 15/02 |
| 2018/0063745 A1* | 3/2018 | Jain | H04B 10/25752 |
| 2018/0131502 A1* | 5/2018 | Askar | H04B 1/1027 |
| 2018/0278290 A1* | 9/2018 | Moorti | H04B 1/123 |

* cited by examiner

METHOD FOR CANCELLING SELF-INTERFERENCE OF IN-BAND FULL-DUPLEX MULTIPLE-INPUT MULTIPLE-OUTPUT WIRELESS COMMUNICATION

CROSS-REFERENCE TO RELATED APPLICATIONS

This application claims priorities to Korean Patent Applications No. 10-2016-0118404 filed on Sep. 13, 2016 and No. 10-2017-0107901 filed on Aug. 25, 2017 in the Korean Intellectual Property Office (KIPO), the entire contents of which are hereby incorporated by reference.

BACKGROUND

1. Technical Field

The present disclosure relates to methods and apparatuses for in-band full-duplex (IFD) multiple-input multiple-output (MIMO) transmission and reception, and more specifically, to methods and apparatuses for the IFD MIMO transmission and reception which can enhance performance of self-interference cancelation (SIC).

2. Related Art

The in-band full duplex (IFD) is a technique for simultaneously transmitting and receiving signals in the same band. It is a technology that can theoretically increase a link capacity up to twice as much as a usual half-duplex (HD) method. However, in the IFD scheme, there is a problem that a self-transmitted signal is introduced into a receiver, and a strong self-interference (SI) signal is generated. Therefore, the SI should be cancelled in order to achieve smooth communications by the IFD method. Usually, a self-interference cancellation (SIC) technique has a problem in that implementation complexity of a transceiver increases. In particular, when the IFD transmission and reception technology is extended to a multiple-input multiple-output (MIMO) system, there is a problem in that the implementation complexity of the transceiver becomes worse due to application of the SIC.

Particularly, a main reason for the high complexity of the SIC in a digital domain is generation of nonlinear SI from nonlinear elements in the transceiver. Such the nonlinear SI is mainly due to nonlinear distortion of a transmission signal. In the conventional HD communications, the nonlinear distortion is lowered below a noise level due to a pathloss, so that it does not cause a big problem. However, in the case of the IFD transceiver in which the transmission signal is directly introduced as SI, the noise level of the nonlinear distortion of the transmission signal can be introduced with a power of several tens of dB or more higher than that of an effective reception signal. Therefore, the SI due to such the nonlinear distortion also should be cancelled.

Especially, in the case of IFD MIMO transmission and reception, the non-linearity of the SI becomes worse due to crosstalk between antennas generated inside and outside the transceiver. Also, since such the nonlinearity of the SI increases a bandwidth of a SI signal, there is a problem of increasing interference between adjacent channels in the IFD transmission and reception system in which multiple channels are used.

SUMMARY

Accordingly, embodiments of the present disclosure provide IFD MIMO transceiving methods and apparatuses for the same which can improve performance of self-interference cancellation (SIC).

In order to achieve the objective of the present disclosure, an operation method of an IFD MIMO transceiver, including a reception part, a transmission part, an analog SI generator, and a SIC controller, may comprise generating, at the SIC controller, a control signal for analog SIC and digital SIC and outputting the control signal to the reception part and the analog SI generator; cancelling, at the SIC controller, SI of a transmission signal of the transmission part based on the control signal; and cancelling, at the reception part, SI of a signal of the reception part based on the control signal.

The control signal may be generated based on an output signal of the analog SI generator and an output signal of a reception (RX) analog-to-digital converter (ADC) in the reception part.

The operation method may further comprise, before the generating a control signal, generating, at a baseband MIMO transmitter in the transmission part, a signal for transmission signal forming by oversampling the transmission signal of the transmission part, and outputting the signal for transmission signal forming to the SIC controller.

The cancelling at the SIC controller may further comprise forming, at the SIC controller, the transmission signal of the transmission part and outputting the formed transmission signal to a transmission (TX) digital-to-analog converter (DAC) in the transmission part.

The SIC controller may output the control signal to a digital SI canceller in the reception part.

The digital SI canceller may cancel SI from the signal of the reception part based on the control signal.

The operation method may further comprise outputting, at the digital SI canceller, the signal of the reception part from which the SI has been cancelled to a baseband MIMO receiver in the reception part.

In order to achieve the objective of the present disclosure, an operation method of a SIC controller in an IFD MIMO transceiver may comprise generating, at a basis generator of the SIC controller, a basis for estimating linear and nonlinear components of SI based on an output signal of a transmission part of the IFD MIMO transceiver and an output signal of a reception part of the MIMO transceiver; estimating, at a transmission signal former of the SIC controller, coefficients for transmission signal forming based on the basis, the output signal of the transmission part, and the output signal of the reception part; forming, at the transmission signal former of the SIC controller, a transmission signal based on the coefficients; and estimating, at a digital self-interference (SI) generator of the SIC controller, a digital SI channel based on the basis, the output signal of the transmission part, and the output signal of the reception part.

The basis generator may generate the basis based on an output signal of a RX ADC in the reception part and an output signal of a baseband MIMO transmitter in the transmission part.

The transmission signal former may estimate the coefficients based on at least one of an output signal of a RX ADC in the reception part and an output signal of a baseband MIMO transmitter in the transmission part.

The transmission signal former may linearize the transmission signal based on the output signal of the baseband MIMO transmitter of the transmission part and the coefficients, and output the linearized transmission signal to the transmission part.

The digital SI generator may estimates the digital SI channel based on the basis and an output signal of a RX ADC in the reception part.

The digital SI generator may regenerate a digital SI based on the digital SI channel and the basis.

The operation method may further comprise generating, at an analog SI coefficient generator of the SIC controller, a control signal for controlling an analog SI generator based on one of the output signal of the reception part and the output signal of the transmission part.

In order to achieve the objective of the present disclosure, a SIC method in an IFD MIMO transceiver, including an antenna part, a reception part, a transmission part, and a SIC controller, may comprise estimating, at the SIC controller, parameters for SIC of a transmission signal during a training interval; estimating, at the SIC controller, a digital self-interference (DSI) channel during the training interval; and cancelling, at the SIC controller, SI of a signal of the transmission part and a signal of the reception part based on the parameters during a data transmission interval.

The parameters may include finite impulse response (FIR) filter coefficients for analog SIC, coefficients for transmission signal forming, and the DSI channel.

The training interval may include a preamble field, an analog SIC training field, a transmission signal forming training field, a digital SIC training field, and a reserved field.

In the training interval, the SIC controller may generate a first basis for the estimation of the parameters and a second basis for the estimation of the DSI channel.

In the training interval, the SIC controller may form the transmission signal based on the parameters and output the formed transmission signal to the reception part and the transmission part.

Also, the training interval may include first to third training fields, a signal may be transmitted through a first antenna of the antenna part during the first training field, a signal may be transmitted through a second antenna of the antenna part during the second training field, a signal may be transmitted through the first antenna and the second antenna during the third training field, the first and second training fields may use an arbitrary signal as a pilot signal, and the third training field may use a random signal as a pilot signal.

The IFD MIMO transceiving method and apparatus according to embodiments of the present disclosure can remarkably enhance the performance of SIC.

In the IFD MIMO transceiving method and apparatus according to embodiments of the present disclosure, the nonlinearity SI generated at a transmitting end may be cancelled at the transmitting end, and the nonlinearity SI generated at a receiving end may be cancelled at the receiving end. This may reduce the complexity of digital SIC by performing a low order DPD and a low order DSIC instead of performing a high order DSIC once.

Also, the IFD MIMO transceiver according to embodiment of the present disclosure can preliminarily linearize and transmit a transmission signal, thereby minimizing interference between adjacent channels, thereby reducing the burden on the DSIC design of the receiving end.

BRIEF DESCRIPTION OF DRAWINGS

Embodiments of the present disclosure will become more apparent by describing in detail embodiments of the present disclosure with reference to the accompanying drawings, in which.

DETAILED DESCRIPTION

Figure 1:
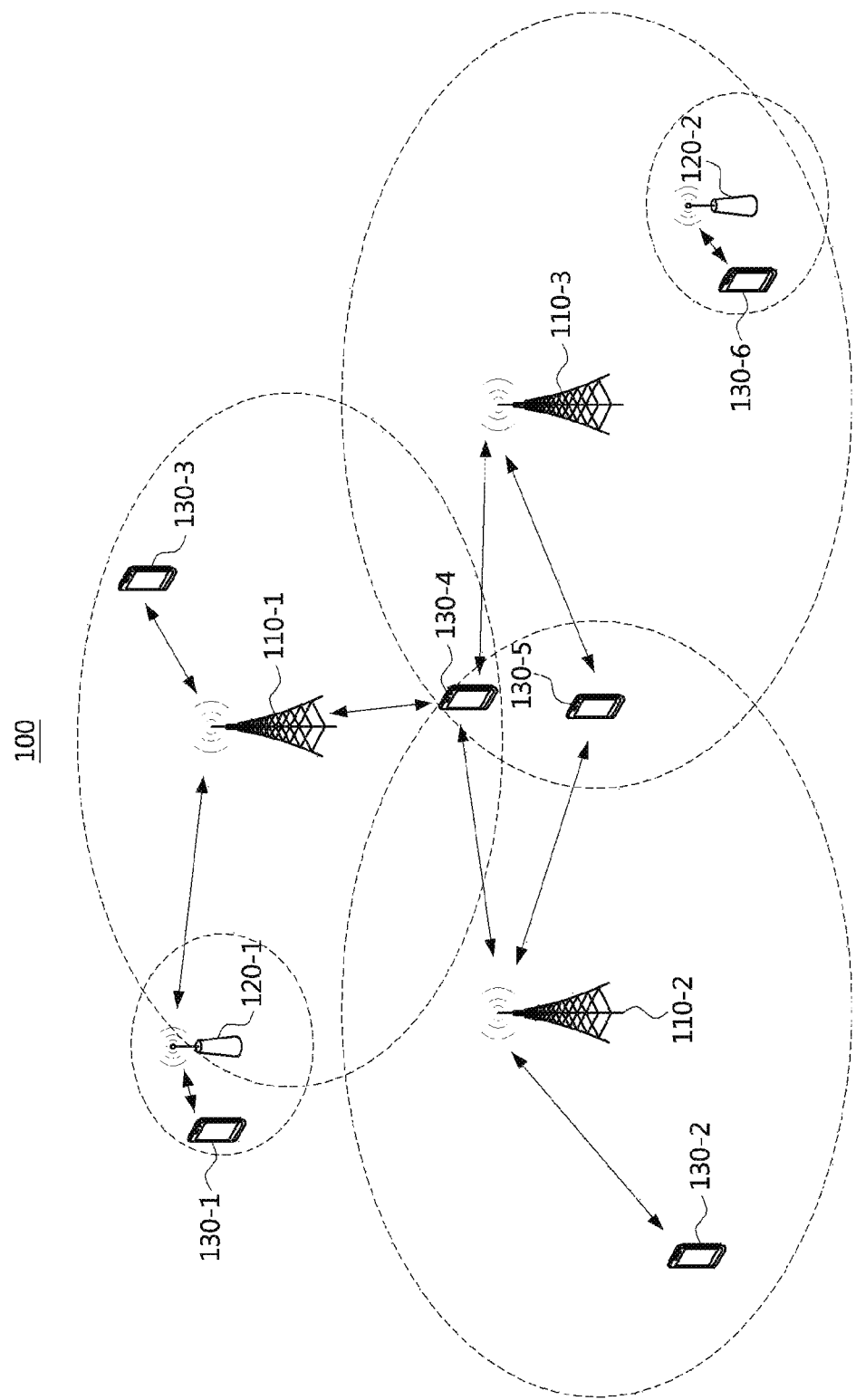
FIG. 1 is a conceptual diagram illustrating a first embodiment of a cellular communication system.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

Hereinafter, wireless communication networks to which exemplary embodiments according to the present disclosure will be described. However, wireless communication networks to which exemplary embodiments according to the present disclosure are applied are not restricted to what will be described below. That is, exemplary embodiments according to the present disclosure may be applied to various wireless communication networks.

FIG. 1 is a conceptual diagram illustrating a first embodiment of a cellular communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Also, the communication system 100 may comprise a core network (e.g., a serving gateway (S-GW), a packet data network (PDN) gateway (P-GW), a mobility management entity (MME), and the like).

The plurality of communication nodes may support $4^{th}$ generation (4G) communication (e.g., long term evolution (LTE), LTE-advanced (LTE-A)), or $5^{th}$ generation (5G) communication defined in the $3^{rd}$ generation partnership project (3GPP) standard. The 4G communication may be performed in a frequency band below 6 gigahertz (GHz), and the 5G communication may be performed in a frequency band above 6 GHz. For example, for the 4G and 5G communications, the plurality of communication nodes may support at least one communication protocol among a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, and a space division multiple access (SDMA) based communication protocol. Also, each of the plurality of communication nodes may have the following structure.

Figure 2:
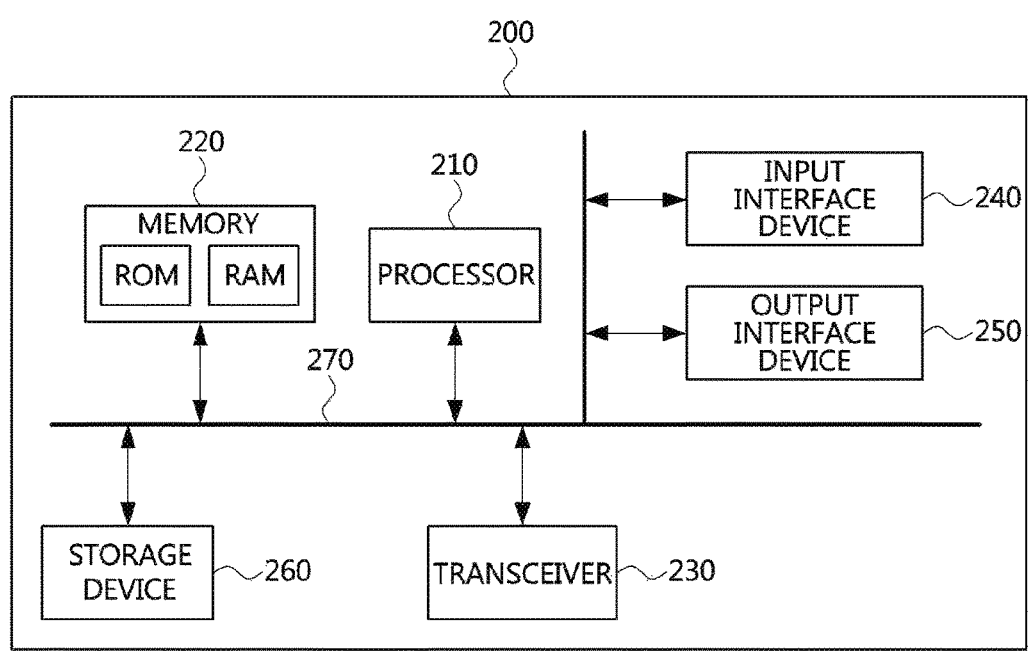
FIG. 2 is a block diagram illustrating a first embodiment of a communication node constituting a cellular communication system.

FIG. 2 is a block diagram illustrating a first embodiment of a communication node constituting a cellular communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, or the like. Also, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, a device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Meanwhile, the communication system may support three types of frame structures. A type 1 frame may be applied to a communication system based on frequency division duplexing (FDD), a type 2 frame may be applied to a communication system based on time division duplexing (TDD), and a type 3 frame may be applied to a unlicensed band based communication system (e.g., a licensed assisted access (LAA) based communication system).

Figure 3:
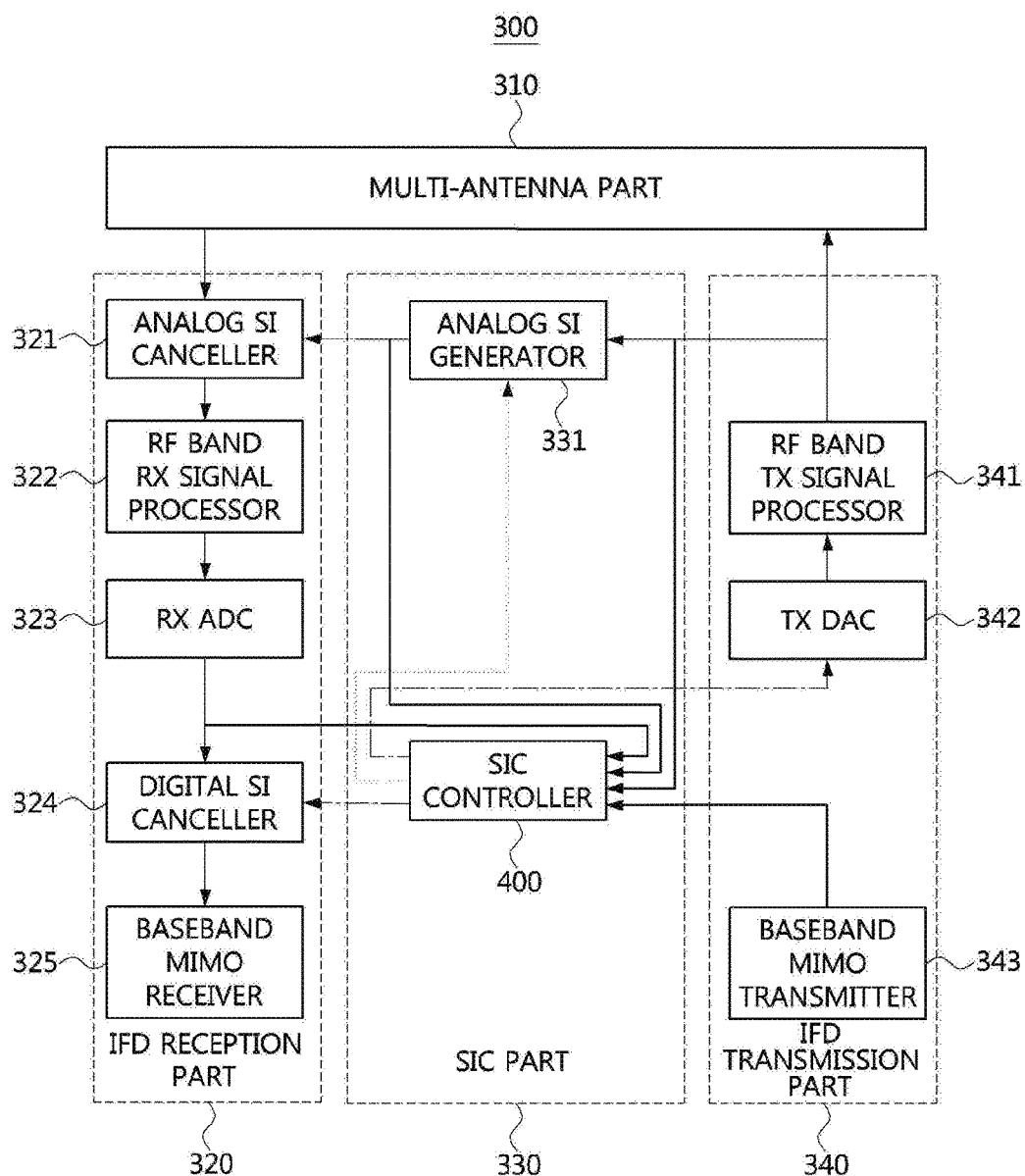
FIG. 3 is a conceptual diagram illustrating a single-band in-band full duplex (IFD) MIMO transceiver according to an embodiment of the present disclosure.
Figure 4:
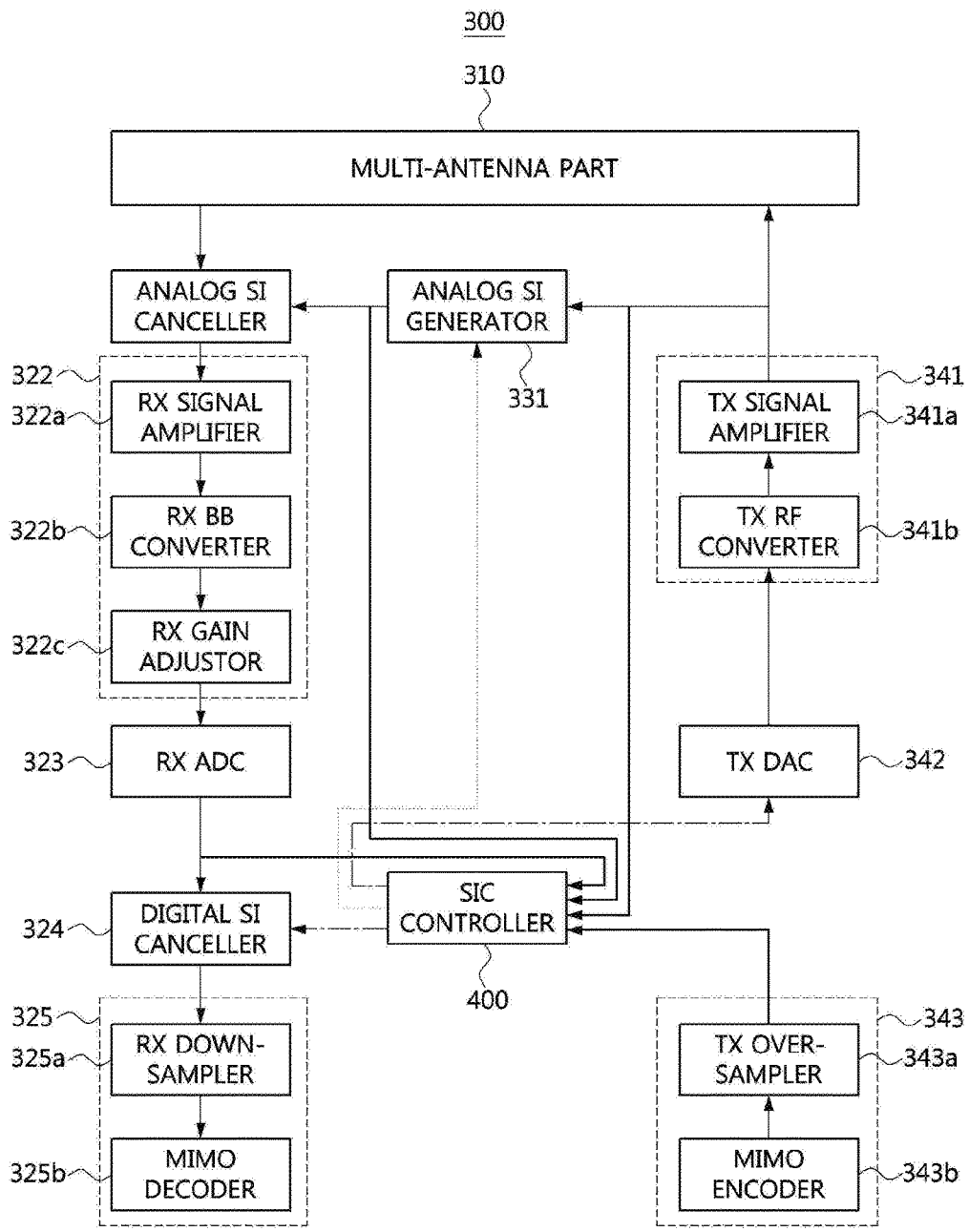
FIG. 4 is a conceptual diagram illustrating a detailed structure of the single-channel IFD MIMO transceiver of FIG. 3.

FIG. 3 is a conceptual diagram illustrating a single-band in-band full duplex (IFD) MIMO transceiver according to an embodiment of the present disclosure, and FIG. 4 is a conceptual diagram illustrating a detailed structure of the single-channel IFD MIMO transceiver of FIG. 3.

Referring to FIGS. 3 and 4, an IFD MIMO transceiver 300 according to an embodiment of the present disclosure may comprise a multi-antenna part 310, an IFD reception 320, a self-interference cancellation (SIC) part 330, and an IFD transmission part 340.

The multi-antenna part 310 may include one or a plurality of antennas, and each antenna may be connected to the IFD transmission part 340 and the IFD reception part 320. Here, a separate antenna may be applied as each of the antennas of the multi-antenna part 310. Also, a shared antenna may be applied as the antennas of the multi-antenna part 310.

The IFD transmission part 340 may include a radio frequency (RF) band transmission (TX) signal processor 341, a TX digital-to-analog converter (DAC) 342, and a baseband MIMO transmitter 343.

The TX DAC 342 may convert output signals of a SIC controller 400 into digital signals, and output the converted digital signals to the RF band TX signal processor 341.

The RF band TX signal processor 341 may up-convert the digital signals received from the TX DAC 342 so that the signals can be transmitted through a RF band, and amplify and output the up-converted signals. The output signals of the RF band TX signal processor 341 may be input to the multi-antenna part 310, an analog SI generator 331, and the SIC controller 400.

The baseband MIMO transmitter 343 may oversample a transmission signal to generate a signal for forming a transmission signal, and output the generated signal to the SIC controller 400. That is, the output signal of the baseband MIMO transmitter 343 may not be directly input to the TX DAC 342, but may be input to the TX DAC 342 after a SIC is performed thereon through the SIC controller 400.

The SIC part 330 may include the analog SI generator 331 and the SIC controller 400.

The analog SI generator 331 may generate an analog SI signal (analog-generated SI, hereinafter referred to as 'AGSI') in an RF analog domain, and provide the generated AGSI to an analog SI canceller 321 and the SIC controller 400. An analog finite impulse response (FIR) filter may be applied as the analog SI generator 331.

The SIC controller 400 may control the analog SI generator 331 and a digital SI canceller 324 to control a SIC operation in a digital domain. For this, the SIC controller 400 may generate a control signal and transmit it to the analog SI generator 331. Also, the SIC controller 400 may generate a SI signal (digitally-generated SI, hereinafter referred to as 'DGSI') in a digital domain, generate a transmission signal for the generated DGSI, and output the generated transmission signal to the digital SI canceller 324 of the IFD reception part 320.

The IFD reception part 320 may include the analog SI canceller 321, an RF band reception (RX) signal processor 322, an RX analog-to-digital converter (ADC) 323, a digital SI canceller 324, and a baseband MIMO receiver 325.

The analog SI canceller 321 may receive an RF band signal from the multi-antenna part 310, and perform an analog SIC (ASIC) operation to cancel an AGSI from the received RF band signal.

The RF band RX signal processor 322 may amplify the received signal and down-convert the received signal to a base band (BB) signal or an intermediate frequency (IF) signal.

The RX ADC 323 may convert the signal input from the RF band RX signal processor 322 into a digital signal, and output it. Here, the output signal of the RX ADC 323 may be input to the digital SI canceller 324 and the SIC controller 400.

The digital SI canceller 324 may receive the output signal of the RX ADC 323 and perform a digital SIC (DSIC) operation to cancel a DGSI from the received output signal of the RX ADC 323. Here, the digital SI canceller 324 may receive the DGSI from the SIC controller 400, and cancel SI from the output signal of the RX ADC 323 using the DGSI. The output signal of the digital SI canceller 324 may be input to the RX baseband MIMO receiver 325.

The RX baseband MIMO receiver 325 may receive a signal on which the SIC has been performed from the digital SI canceller 324, downsample and decode the inputted signal, and then output the down-sampled and decoded signal.

The signal transmission and reception between the IFD transmission part 340 and the SIC controller 400 and the signal transmission and reception between the IFD reception part 330 and the SIC controller 400 will be described. Referring to FIGS. 3 and 4, solid lines may represent signals input to the SIC controller 400, and dotted lines may represent signals output from the SIC controller 400.

The output signal of the RF band TX signal processor 341 may be input to the SIC controller 400. Also, the output signal of the baseband MIMO transmitter 343 may be input to the SIC controller 400. Here, the output signal of the baseband MIMO transmitter 343 may not be input to the TX DAC 342, and the output signal of the SIC controller 400 may be input to the TX DAC 342.

The baseband MIMO transmitter 343 of the IFD transmission part 340 may include a TX oversampler 343a and a MIMO encoder 343b. The IFD MIMO transceiver 300 according to the present disclosure may perform a SIC operation for cancelling nonlinear components of SI in an oversampling (OS) domain, and the TX oversampler 343a may oversample the transmission signal and transmit it to the SIC controller 400.

The RF band RX signal processor 322 of the IFD reception part 320 may include an RX signal amplifier 322a, an RX baseband (BB) converter 322b, and an RX gain adjustor 322c. The RX signal amplifier 322a may be composed of a plurality of low-noise amplifiers (LNAs) for amplifying a received signal. Here, the number of the LNAs may be equal to the number of reception antennas of the multi-antenna part 310. Each LNA may be connected to each of the reception antennas, and the outputs of the reception antennas may be input to the respective LNAs.

The RX BB converter 322b may down-convert the signal received from the RX signal amplifier 422a to a BB signal, and output the down-converted signal to the RX gain adjustor 322c. The RX BB converter 322b may also be implemented as one or a plurality of mixers, and may convert the received signal to an IF band signal. The RX gain adjustor 322c may be configured with a plurality of automatic gain controllers (AGCs). The RX gain adjustor 322c may adjust the gain of the signal input from the RX BB converter 322b and output the gain-controlled signal. The output of each AGC may be input to the RX ADC 323. The RF band RX signal processor 322 may not include the RX gain adjustor 322c, and the output of the RX BB converter 322b may be supplied to the RX ADC 323.

The baseband MIMO receiver 325 of the IFD reception part 320 may include an RX downsampler 325a and a MIMO decoder 325b. The IFD MIMO transceiver 300 according to the present disclosure may perform a SIC operation in an oversampling (OS) domain to cancel non-linear components of SI, and the RX downsampler 325a may receive the signal on which the SIC has been performed and down-sample it. The RX down-sampler 325a may output the down-sampled signal to the MIMO decoder 325b.

The SIC controller 400 may receive the output signal of the analog SI generator 331 and the output signal of the RX ADC 323, and generate control signals for controlling the digital SI canceller 324 and the analog SI generator 331. The SIC controller 400 may transmit the generated control signals to the digital SI canceller 324 and the analog SI generator 331.

Figure 5:
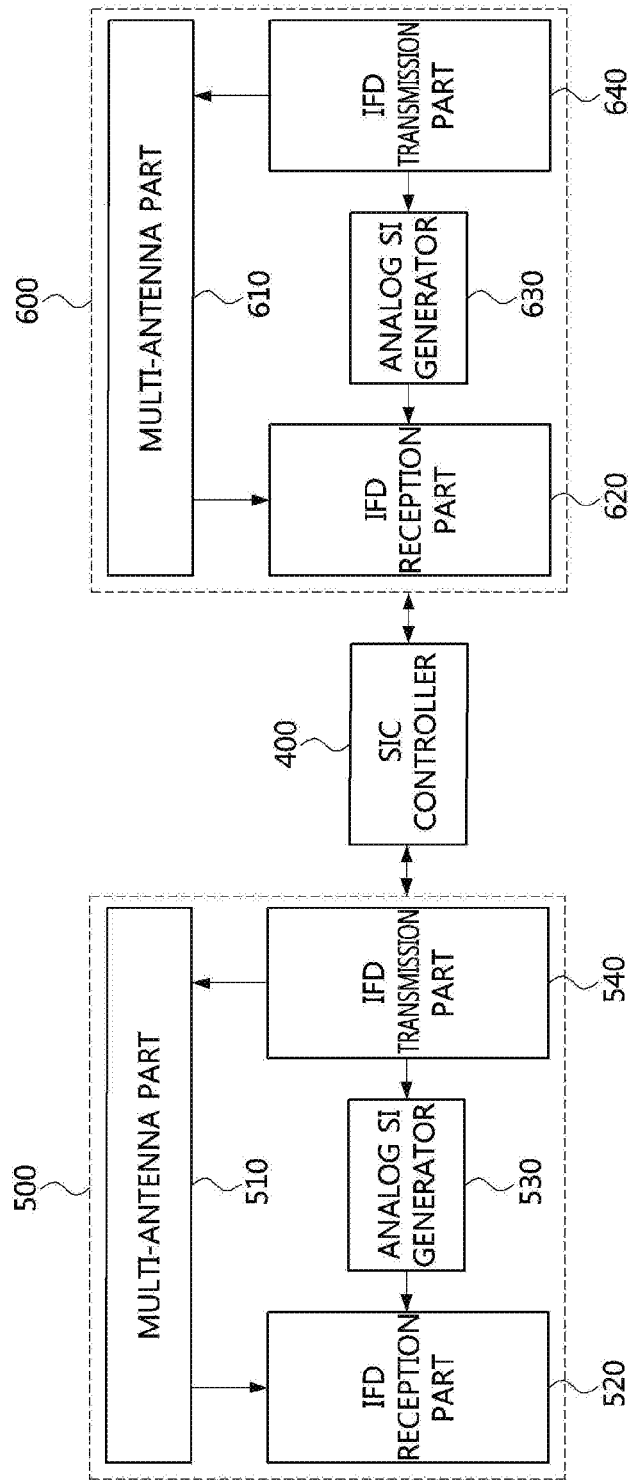
FIG. 5 is a conceptual diagram illustrating a multi-channel IFD MIMO transceiver according to an embodiment of the present disclosure.
Figure 6:
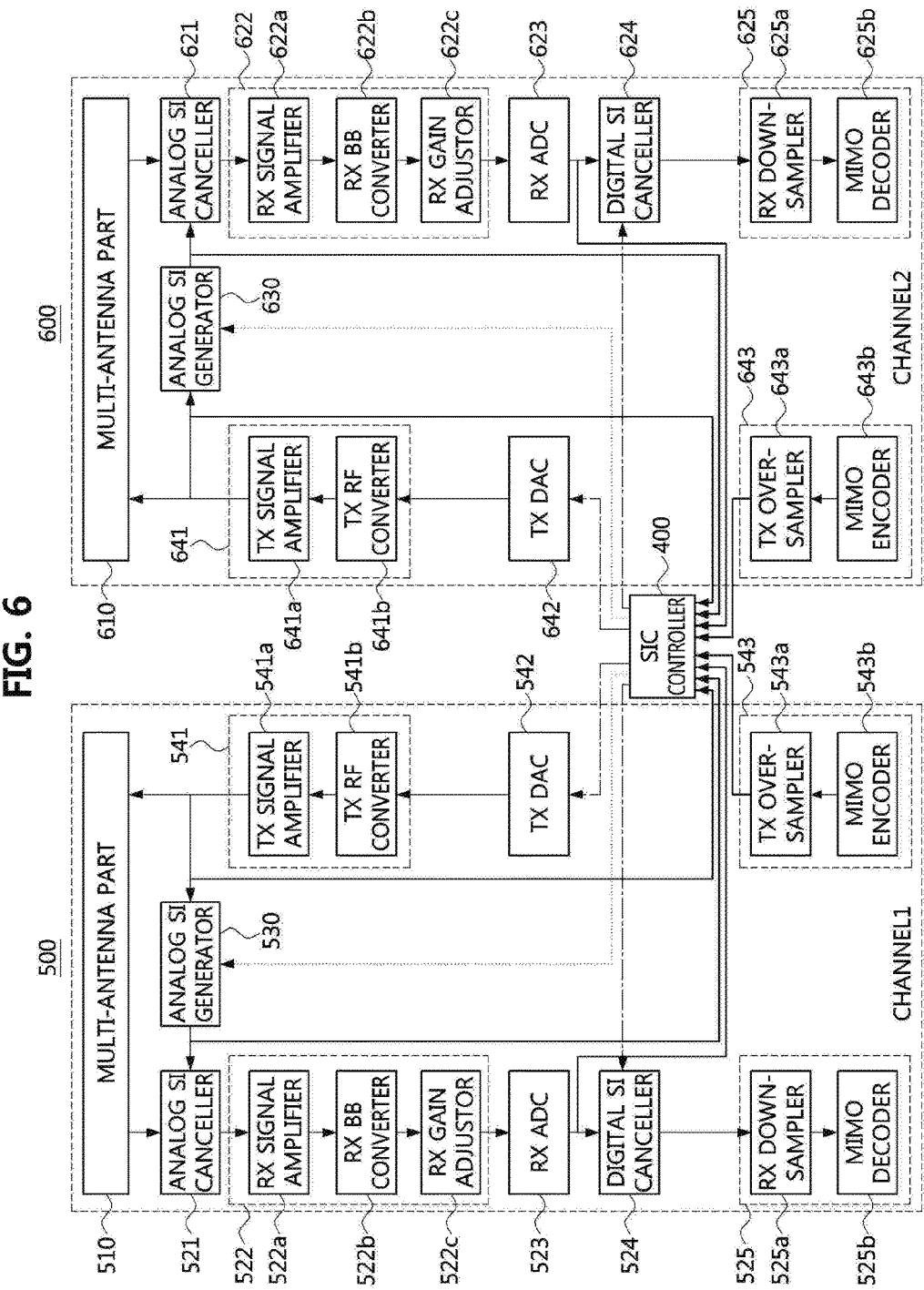
FIG. 6 is a conceptual diagram illustrating a detailed structure of the multi-channel IFD MIMO transceiver of FIG. 5.

FIG. 5 is a conceptual diagram illustrating a multi-channel IFD MIMO transceiver according to an embodiment of the present disclosure, and FIG. 6 is a conceptual diagram illustrating a detailed structure of the multi-channel IFD MIMO transceiver of FIG. 5.

Referring to FIGS. 5 and 6, a first IFD MIMO transceiver 500 and a second IFD MIMO transceiver 600 may share a single SIC controller 400. The first IFD MIMO transceiver 500 may comprise a multi-antenna part 510, an IFD reception part 520, an analog SI generator 530, an IFD transmission part 540, and the SIC controller 400. The first IFD MIMO transceiver 500 may transmit and receive a signal using a first channel The second IFD MIMO transceiver 600 may comprise a multi-antenna part 610, an IFD reception part 620, an analog SI generator 630, an IFD transmission part 640, and the SIC controller 400. The second IFD MIMO transceiver 600 may transmit and receive a signal using a second channel.

The IFD reception part 520 of the first IFD MIMO transceiver 500 may include an analog SI canceller 521, an RF band RX signal processor 522, an RX ADC 523, a digital SI canceller 524, and a baseband MIMO receiver 525.

The IFD transmission part 540 of the first IFD MIMO transceiver 500 may include an RF band TX signal processor 541, a TX DAC 542, and a baseband MIMO transmitter 543.

The IFD reception part 620 of the second IFD MIMO transceiver 600 may include an analog SI canceller 621, an RF band RX signal processor 622, an RX ADC 623, a digital SI canceller 624, and baseband MIMO receiver 625.

The IFD transmission part 640 of the second IFD MIMO transceiver 600 may include an RF band TX signal processor 641, a TX DAC 642, and a baseband MIMO transmitter 643.

The configurations and operations of the multi-antenna parts 510 and 610, the IFD reception parts 520 and 620, the analog SI generators 530 and 630, and the IFD transmission parts 540 and 640, except for the SIC controller 400, are identical to those for the IFD MIMO transceiver 300 explained referring to FIG. 4, and detailed description thereof will be omitted.

In FIGS. 5 and 6, the analog SI generators 530 and 630 are disposed in the first IFD MIMO transceiver 500 and the second IFD MIMO transceiver 600, respectively. However, embodiments of the present disclosure are not limited thereto, and the first IFD MIMO transceiver 500 and the second IFD MIMO transceiver 600, which transmit and receive signals using different channels, may share a single analog SI generator.

The SIC controller 400 may control a DSIC operation of the analog SI generator 530 and the digital SI canceller 524 disposed in the first IFD MIMO transceiver 500. Also, the SIC controller 400 may control a DSIC operation of the analog SI generator 630 and the digital SI canceller 624 disposed in the second IFD MIMO transceiver 600.

For this, the output signal of the baseband MIMO transmitter 543 (i.e., the output signal of the TX oversampler 543a), the output signal of the RF band TX signal processor 541 (i.e., the output signal of the TX signal amplifier 541a), the output signal of the analog SI generator 530, and the output signal of the RX ADC 523 may be input to the SIC controller 400. Also, the output signal of the baseband MIMO transmitter 643 (i.e., the output signal of the TX oversampler 643a), the output signal of the RF band TX signal processor 641 (i.e., the output signal of the TX signal amplifier 641a), the output signal of the analog SI generator 630, and the output signal of the RX ADC 623 may be input to the SIC controller 400.

The output signal of the SIC controller 400 may be input to the TX DACs 542 and 642, respectively. Also, the control signal output from the SIC controller 400 may be input to the analog SI generators 530 and 630, respectively. Also, the DGSI signal output from the SIC controller 400 may be input to each of the digital SI cancellers 524 and 624.

In the conventional IFD MIMO transceiver, the output of the baseband MIMO transmitter is directly input to the TX DAC. However, the first IFD MIMO transceiver 500 and the second IFD MIMO transceiver 600 according to the present disclosure are configured such that the outputs of the baseband MIMO transmitters 543 and 643 are not directly supplied to the TX DACs 542 and 642. The output of the baseband MIMO transmitter (i.e., a transmission signal) may be converted into a form favorable to the SIC in a pre-distorter 424 of the SIC controller 400, and the converted transmission signal may be input the TX DACs 542 and 642.

In FIGS. 5 and 6, the first IFD MIMO transceiver 500 and the second IFD MIMO transceiver 600 may be configured for two channels. However, embodiments of the present disclosure are not limited thereto, and the number of IFD MIMO transceivers may be increased in proportion to an increase in the number of channels.

Figure 7:
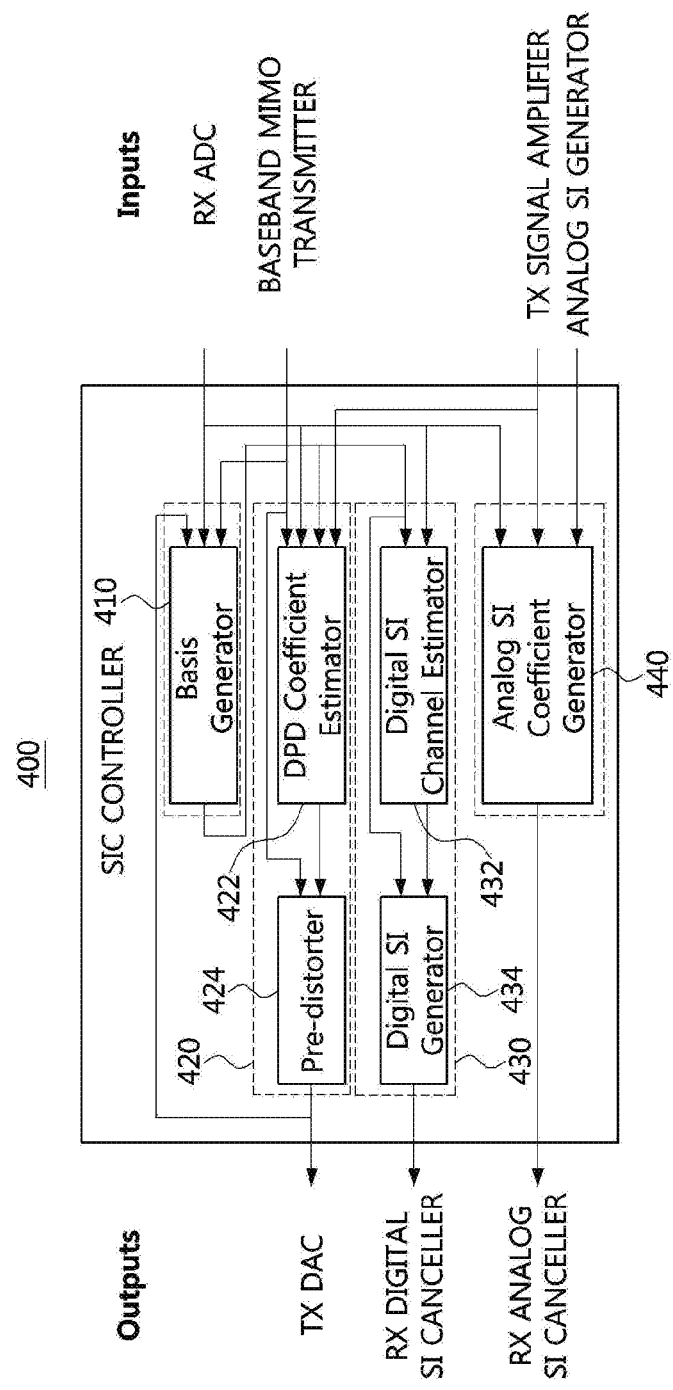
FIG. 7 is a diagram illustrating a SIC controller according to an embodiment of the present disclosure.
Figure 8:
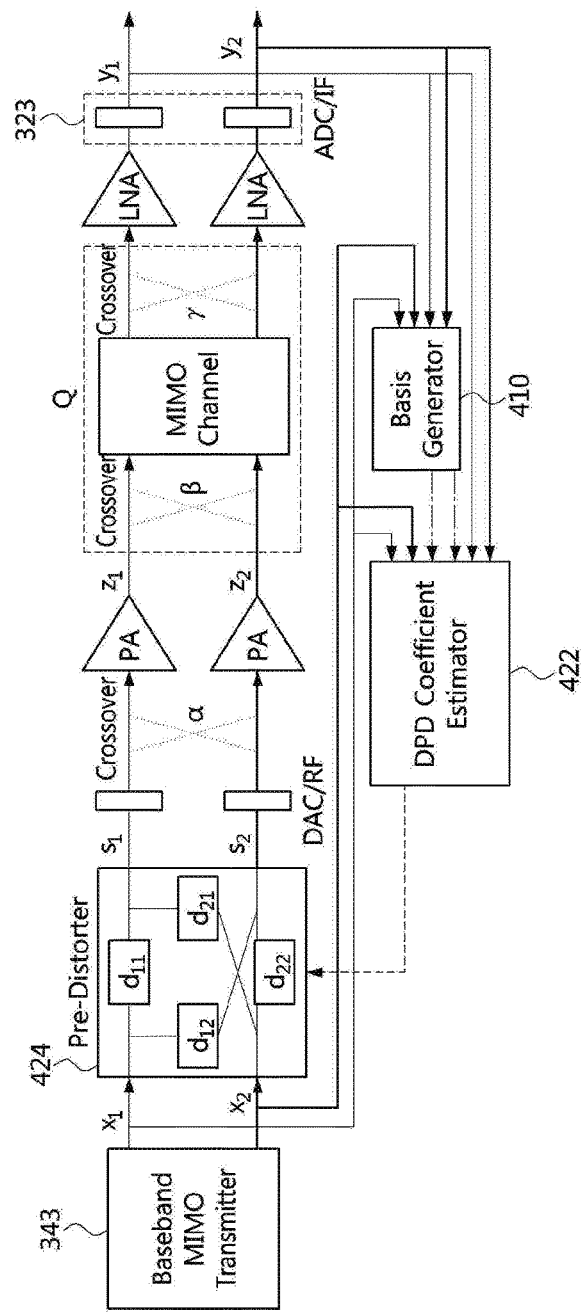
FIG. 8 is a diagram illustrating an example of a transmission signal former shown in FIG. 7.

FIG. 7 is a diagram illustrating a SIC controller according to an embodiment of the present disclosure, and FIG. 8 is a diagram illustrating an example of a transmission signal former shown in FIG. 7.

Referring to FIGS. 7 and 8 together with FIG. 6, the SIC controller 400 may be shared by the first IFD MIMO transceiver 500 and the second IFD MIMO transceiver 600, and the SIC controller 400 may exchange signals with the first IFD MIMO transceiver 500 and the second IFD MIMO transceiver 600. A signal input/output of the SIC controller 400 may be applied equally to the case for multiple channels as well as the case for a single channel Specifically, the SIC controller 400 may output control signals of the analog SI generators 530 and 630, and DGSI signals of the digital SI cancellers 524 and 624 together with the transmission signal. To this end, the SIC controller 400 may receive the output signals of the baseband MIMO transmitters 543 and 643 and the output signals of the RX ADCs 523 and 623. Also, the SIC controller 400 may receive the output signals of the RF band TX signal processors 541 and 641 and the output signals of the analog SI generators 530 and 630.

For the signal input/output of the SIC controller 400, the SIC controller 400 may include a basis generator 410, a transmission signal former 420, a digital SI generator 430, and an analog SIC coefficient generator 440. Here, the transmission signal former 420 may include a digital pre-distorter (DPD) coefficient estimator 422 and a digital pre-distorter (DPD) 424.

The digital SI generator 430 may include a digital SI channel estimator 432 and a digital SI generator 434.

The basis generator 410 may receive one or more of an output signal of the DPD 424, output signals of the baseband MIMO transmitters 543 and 643, and output signals of the RX ADCs 523 and 623. The basis generator 410 may generate a basis (or kernel) used for estimating linear and non-linear components of SI based on the input signal. The basis generated by the basis generator 410 may be input to the DPD coefficient estimator 422 and the digital SI channel estimator 432. Here, the basis input to the DPD coefficient estimator 422 and the basis input to the digital SI channel estimator 432 may be the same or different from each other according to an algorithm of the basis generator 410. That is, the basis generator 410 may generate one basis and output it to the DPD coefficient estimator 422 and the digital SI channel estimator 432.

As another example, the basis generator 410 may separately generate a first basis to be input to the DPD coefficient estimator 422 and a second basis to be input to the digital SI channel estimator 432, respectively. The basis generator 410 may output the first basis to the DPD coefficient estimator 422 in accordance with an operation timing of the DPD coefficient estimator 422. Also, the basis generator 410 may output the second basis to the digital SI channel estimator 432 in accordance with an operation timing of the digital SI channel estimator 432.

The transmission signal former 420 may receive one or more of the bases of the basis generator 410, the output signals of the baseband MIMO transmitters 543 and 643, and the output signals of the RX ADCs 523 and 623. The transmission signal former 420 may generate and output a transmission signal based on the input signal. Here, the transmission signal former 420 may output the transmission signal to the TX DACs 542 and 642. Also, the transmission signal former 420 may output the transmission signal to the basis generator 410. The transmission signal former 420 may linearize the transmission signal in advance. Through this, nonlinearity of the SI signal, which has passed through nonlinear elements of the first IFD MIMO transceiver 500 and the second IFD MIMO transceiver 600 and reaches the RX ADCs 523 and 623, can be suppressed.

Specifically, the DPD coefficient estimator 422 of the transmission signal former 420 may receive one or more of the output signals of the baseband MIMO transmitters 543 and 643, the output signals of the TX signal amplifiers 541a and 641a, and the output signals of the RX ADCs 523 and 623. The DPD coefficient estimator 422 of the transmission signal former 420 may estimate coefficients for linearization of the transmission signal based on the input signal, and output the estimated coefficients to the DPD 424.

The DPD 424 of the transmission signal former 420 may linearize the transmission signal based on the signal input from the baseband MIMO transmitters 543 and 643 and the coefficients input from the DPD coefficient estimator 422. Thereafter, the DPD 424 may output the linearized transmission signal to the TX DACs 542 and 642.

In the conventional technology, in order to estimate coefficients for linearization of the transmission signal, a signal path for the coefficient estimation other than a reception path of a signal is required, and accordingly, there is a problem that a separate mixer, a filter, and an ADC are required. On the other hand, the transmission signal former 420 according to an embodiment of the present disclosure may not require a separate path for estimating coefficients other than a reception path of a signal, and coefficients for linearization of the transmission signal may be estimated by using the output signals of the RX ADCs 524 and 624 of the IFD reception parts 520 and 620. Also, the transmission signal former 420 may eliminate the nonlinearity of the SI introduced from the IFD transmission parts 540 and 640 as well as the nonlinearity of the TX transmission signal introduced from the IFD transmission parts 540 and 640.

The digital SI generator 430 of the SIC controller 400 may include a digital SI channel estimator 432 and a digital SI generator 434. The digital SI generator 430 may perform digital signal processing for cancelling SI remaining in the RX ADCs 523 and 623.

Specifically, the digital SI channel estimator 432 may use the output signals of the RX ADCs 523 and 623 and the basis input from the basis generator 410 to estimate the channel of the SI (i.e., coefficients corresponding to each basis). The digital SI channel estimator 432 may output the estimated channel of the SI to the digital SI generator 434.

The digital SI generator 434 may regenerate the DGSI by using the channel of the SI estimated by the digital SI channel estimator 432 and the basis input from the basis generator 410. Here, the digital SI generator 434 may regenerate the SI (i.e., DGSI) to be removed from the output signals of the RX ADCs 523 and 623, and output the regenerated DGSI to the digital SI cancellers 524 and 624.

Since the nonlinear SI generated at the transmitting end is removed through signal forming of the transmission signal former 420, the nonlinear SI generated at the receiving end (e.g., nonlinear SI generated at the LNA and the mixer of the receiving end) may be included in the DGSI together with the SI of the linear component.

The analog SI coefficient generator 440 may receive output signals of the TX signal amplifiers 541*a* and 641*a*, the analog SI generators 530 and 630, and the RX ADCs 523 and 623 which are disposed in the RF band TX signal processor 341. The analog SI coefficient generator 440 may estimate coefficients for controlling filters of the analog SI generators 530 and 630 based on the input signals, and output the estimated coefficients. Here, the output signals of the TX signal amplifiers 541*a* and 641*a*, the analog SI generators 530 and 630, and the RX ADCs 523 and 623 which are disposed in the RF band TX signal processor 341 may be used selectively according to the algorithm of the analog SI coefficient generator 440 in order to estimate coefficients for controlling the filters of the analog SI generators 530 and 630.

In the MIMO system, when crosstalk between antennas occurs, the order of the basis increases and the channel of the SI (coefficients corresponding to each basic signal) to be estimated increases exponentially. Therefore, when the nonlinear SI generated at the transmitting end and the receiving end is regenerated in the digital SI generator 434, the degree of operation and the operation load of the digital SI generator 434 may be increased. In the present disclosure, it is made possible to separate the nonlinear SI of the transmitting end and the receiving end, respectively, and perform a transmission signal forming of a low order and a DSIC operation of a low order. In the case of applying the SI elimination method, in which the transmission signal shaping and the DSIC operation are performed simultaneously, to the multi-channel IFD MIMO transceiver, the performance of the SIC may be improved, and the complexity and operation load of the digital SI generator 434 may be lowered.

Nonlinearity distortion of a transmission signal may cause a problem that a band of a transmission signal spreads widely on the frequency axis. Therefore, in a multi-channel IFD MIMO transceiving system, the nonlinearity of SI, which is caused by crosstalk between antennas in each channel, may cause interference to adjacent channels if adjacent channels are stuck together on the frequency axis. Such the interference between adjacent channels may increase the burden on the SIC. The IFD MIMO transceiver 300 according to the present disclosure linearizes the transmission signal in the transmission signal former 420 of the SIC controller 400 in advance, and transmit the transmission signal, thereby suppressing interference between adjacent channels on multiple channels as much as possible, and reducing the burden of the DSIC at the receiving end.

Figure 9:
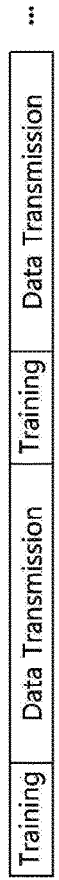
FIG. 9 is a diagram showing training intervals and data transmission intervals in an IFD communication according to an embodiment of the present disclosure.

FIG. 9 is a diagram showing training intervals and data transmission intervals in an IFD communication according to an embodiment of the present disclosure.

Referring to FIG. 9, the single-channel IFD MIMO transceiver shown in FIG. 3 and the multi-channel IFD MIMO transceiver shown in FIG. 7 may perform IFD communications through repetition of the training interval and the data transmission interval.

The training interval is an interval in which the SIC controller 400 acquires information necessary for the SIC. Based on a predetermined signal of the training interval, parameters required for the ASIC, the transmission signal forming, and the DSIC may be estimated. Here, the parameters estimated based on the training interval may include finite impulse response (FIR) filter coefficients for the ASIC, transform coefficients for the transmission signal forming, and a digital self-interference (DSI) channel.

The data transmission interval is an interval in which information to be actually transmitted and received is transmitted and received. The SIC function for cancelling SI from the received signal using various SIC parameters acquired in the training interval may be performed. The length and period of the training interval and the data transmission interval may be variably set according to the communication environment and the required amount of data to be transmitted.

Figure 10:
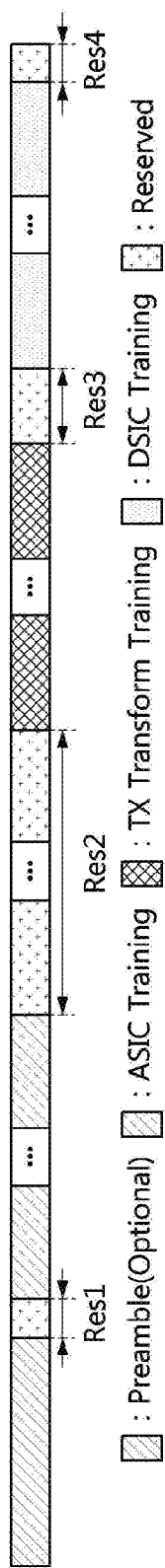
FIG. 10 is a diagram illustrating a structure of a transmission signal in a training interval.

FIG. 10 is a diagram illustrating a structure of a transmission signal in a training interval.

Referring to FIG. 10, a transmission signal of a training interval may include a preamble field, an ASIC training field, a transmission signal forming training field (hereinafter, referred to as 'TX signal transform training field'), a DSIC training field, and a reserved field. The length of each field may be variably set according to the communication environment and the required amount of data to be transmitted.

The preamble field may be used for synchronization and channel estimation if there is information to be decoded prior to the estimation of the parameters required for SIC. If there is no information to be decoded before the estimation of the parameters according to the communication environment, the preamble field may be omitted.

Predetermined sequences may be transmitted respectively through the ASIC training field, the TX signal transform training field, and the DSIC training field.

The reserved field is a field used for reflecting latency, preventing interference, and controlling gain occurring when each training function is performed. The reserved field may be an empty period in a form of a guard time, or a specific sequence may be transmitted through the reserved field. There is no particular restriction on the duration of the training field, the sequence used in each training field, and the type of sequence used in the reserved field. In addition, there is no particular restriction on the arrangement of the preamble field in the training interval.

Hereinafter, the operation of the transmission signal former 420 in the training interval will be described with reference to FIG. 11 based on the single-channel IFD MIMO transceiver 300 shown in FIG. 3 and FIG. 7. However, embodiments of the present disclosure are not limited thereto, and the IFD MIMO transceiving method according to an embodiment of the present disclosure may be equally applied to a single-channel IFD MIMO transceiver and a multi-channel IFD MIMO transceiver.

Figure 11:
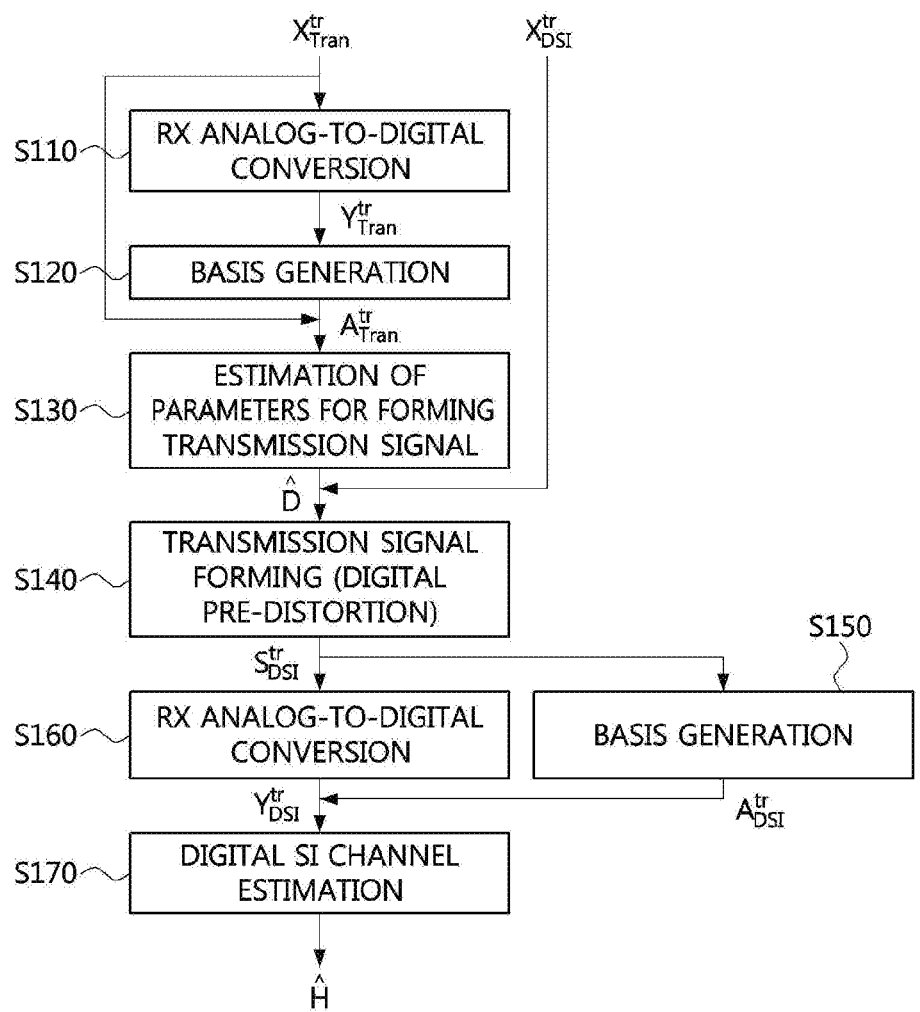
FIG. 11 is a diagram explaining an operation of a transmission signal former in a training interval.

FIG. 11 is a diagram explaining an operation of a transmission signal former in a training interval.

Referring to FIGS. 3, 7 and 11, the IFD MIMO transceiver 300 according to the present disclosure may performs a SIC operation for cancelling nonlinear components of SI in an oversampling region, and have M antennas, and M transmission and reception streams each of which corresponds to each of the M antennas.

First, the analog SI canceller 321 may remove AGSI from an RF band reception signal and transmit the RF band reception signal whose AGSI is removed to the RF band RX signal processor 322. Thereafter, the RF band RX signal processor 322 may amplify the RF band reception signal, down-convert the amplified signal to a BB signal, adjust a gain of the down-converted signal, and output the signal to the RX ADC 323.

Subsequently, the RX ADC 323 may oversample the signal input from the RF band RX signal processor 322 and transmit it to the SIC controller 400 (S110).

Here, the output signal of the baseband MIMO transmitter 343 may be defined as $X_{Trans}^{tr}$ in the TX signal transform training field. Here, $X_{Trans}^{tr}$ may be expressed as Equation 1 below.

$$X_{Trans}^{tr}=[x_{Trans,1}^{tr}\ldots x_{Trans,M}^{tr}]. \quad \text{[Equation 1]}$$

In Equation 1, each of column vectors $x_{Trans,1}^{tr} \ldots x_{Trans,M}^{tr}$ may denote a first to an M-th transmission signal stream of the baseband MIMO transmitter 343 during the TX signal transform training field. If the output signal of the RX ADC 323 of the receiving end during the TX signal transform training field is $Y_{Trans}^{tr}$, $Y_{Trans}^{tr}$ may be expressed by Equation 2 below.

$$Y_{Trans}^{tr}=[y_{Trans,1}^{tr}\ldots y_{Trans,M}^{tr}]. \quad \text{[Equation 2]}$$

In Equation 2, each of column vectors $y_{Trans,1}^{tr} \ldots y_{Trans,M}^{tr}$ may refer to an output signal of the RX ADC 323 for streams the first to M-th stream during the TX signal transform training field.

Thereafter, the basis generator 410 of the SIC controller 400 may receive $Y_{Trans}^{tr}$ from the RX ADC 323, and generate a basis for estimation of the transmission signal forming parameters. Here, the basis generator 410 may generate a basis matrix $A_{Trans}^{tr}$ for estimating the transmission signal forming parameters based on $Y_{Trans}^{tr}$. Here $A_{Trans}^{tr}$ generated by the basis generator 410 is a matrix into which a plurality of toeplitz matrices are combined, and may have a form of a following Equation 3. The basis generated by the basis generator 410 may be output to the transmission signal former 420 and the digital SI generator 430 of the SIC controller 400 (S120).

$$A_{Trans}^{tr}=[A_{Trans,1}^{tr}A_{Trans,2}^{tr}\ldots A_{Trans,K_T}^{tr}]. \quad \text{[Equation 3]}$$

In Equation 3, $K_T$ is the total number of different bases generated for estimation of the DPD coefficients at the basis generator 410, and $A_{Trans,k}^{tr}$ may refer to the generated toeplitz matrix generated based on a k-th basis generated from $Y_{Trans}^{tr}$.

Here, the SIC controller 400 may selectively use the signal input from the TX signal amplifier 341a of the TX signal processor 341 to the DPD coefficient estimator 422 of the SIC controller 400 for the estimation of the DPD coefficients.

Then, the DPD coefficient estimator 422 may receive $A_{Trans}^{tr}$ and $X_{Trans}^{tr}$, and estimate a parameter $\hat{D}$ for forming a transmission signal (S130). Here, the parameter $\hat{D}$ for forming the transmission signal may be expressed by Equation 4.

$$\hat{D}=f(A_{Trans}^{tr}, X_{Trans}^{tr}) \quad \text{[Equation 4]}$$

Then, in the training field for DSI channel estimation, the output signal of the baseband MIMO transmitter 343 may be defined as $X_{DSI}^{tr}$. The output signal $X_{DSI}^{tr}$ of the baseband MIMO transmitter 343 may be input to the transmission signal former 420 and may be expressed by Equation 5.

$$X_{DSI}^{tr}=[x_{DSI,1}^{tr}\ldots x_{DSI,M}^{tr}]. \quad \text{[Equation 5]}$$

The column vectors described $x_{DSI,1}^{tr} \ldots x_{DSI,M}^{tr}$ in Equation 5 may denote the first to M-th transmission streams output from the baseband MIMO transmitter 343 during the training field for DSI channel estimation. The transmission signal former 420 of the SIC controller 400 may form $X_{DSI}^{tr}$ according to Equation 5 output from the baseband MIMO transmitter 343 using the parameter $\hat{D}$ estimated in Equation (4) (S140).

The basis generator 410 may separately generate a basis to be input to the DPD coefficient estimator 422 and a basis to be input to the digital SI channel estimator 432. The basis generator 410 may generate the basis to be input to the DPD coefficient estimator 422 based on Equation 3 in the step S120. The basis generator 410 may generate the basis to be input to the digital SI channel estimator 432 based on Equation 6 and Equation 7 below.

$$S_{DSI}^{tr}=g(\hat{D},X_{DSI}^{tr}). \quad \text{[Equation 6]}$$

The basis generator 410 of the SIC controller 400 may receive $S_{DSI}^{tr}$ of Equation 6 and generate a basis matrix $A_{DSI}^{tr}$ for DSI channel estimation (S150). Here, the basis matrix may be expressed by Equation 7.

$$A_{DSI}^{tr}=[A_{DSI,1}^{tr}A_{DSI,2}^{tr}\ldots A_{DSI,K_D}^{tr}]. \quad \text{[Equation 7]}$$

In Equation 7, $K_D$ is the total number of different bases generated by the basis generator 410 for DSI channel estimation, and $A_{DSI,k}^{tr}$ is a toeplitz matrix generated through a k-th basis generated from $S_{DSI}^{tr}$. Here, basis generation methods used for generating the basis matrices based on Equations 3 and 7 in the basis generator 410 may be the same or different from each other. That is, the basis generator 410 of the present disclosure may perform the operation S120 based Equation 3 and the operation S150 based on Equation 7 in consideration of the case that the bases for the DPD coefficient estimator and the digital SI channel estimator are the same as well as the case that they are different from each other.

Then, the RX ADC 323 may convert the analog signal input from the RF band RX signal processor 322 during the training field for DSI channel estimation (S160). The converted signal in the RX ADC 323 may be output to the digital SI canceller 324 and the SIC controller 400.

Here, the output signal of the RX ADC 323 may be defined as $Y_{DSI}^{tr}$ during the training field for DSI channel estimation, and may be expressed by Equation 8 below.

$$Y_{DSI}^{tr}=[y_{DSI,1}^{tr}\ldots y_{DSI,M}^{tr}]. \quad \text{[Equation 8]}$$

In Equation 8, each of column vectors $y_{DSI,1}^{tr} \ldots y_{DSI,M}^{tr}$ may refer to an output signal of the RX ADC 323 for each of the first to M-th streams during the training field for DSI channel estimation. The output signals $y_{DSI,1}^{tr} \ldots y_{DSI,M}^{tr}$ of the RX ADC 323 may be input to the digital SI channel estimator 432.

Then, the digital SI channel estimator 432 may estimate the DSI channel using $Y_{DSI}^{tr}$ and $A_{DSI}^{tr}$ input from the RX ADC 323 (S190). Here, an estimated value $\hat{H}$ of the DSI channel may be expressed by Equation 9 below.

$$\hat{H}=(A_{DSI}^{tr})^{\dagger}Y_{DSI}^{tr}. \quad \text{[Equation 9]}$$

In Equation 9, $(A_{DSI}^{tr})^{\dagger}$ may be expressed as a pseudo inverse matrix of the matrix $(A_{DSI}^{tr})^{\dagger}$, and $\hat{H}$ of Equation 9 may be expressed as Equation 10 below.

$$\hat{H}=[\hat{h}_1 \hat{h}_2 \ldots \hat{h}_{K_D}]. \quad \text{[Equation 10]}$$

In Equation 10, $\hat{h}_j$ may be expressed as a column vector and may denote a DSI channel corresponding to the j-th basis generated in Equation 6.

Figure 12:
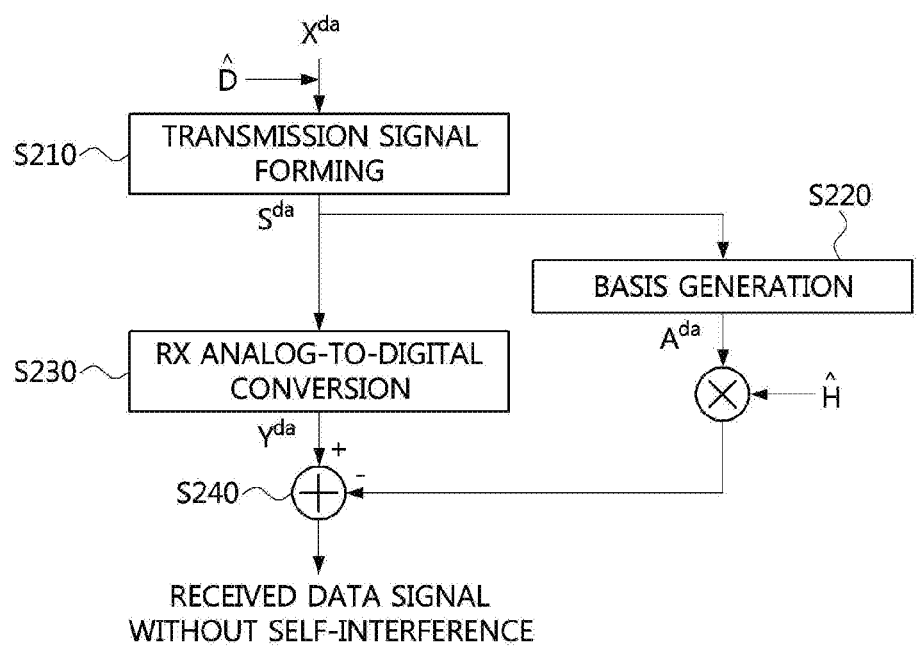
FIG. 12 is a diagram explaining an operation of a transmission signal former in a data transmission interval.

FIG. 12 is a diagram explaining an operation of a transmission signal former in a data transmission interval.

Referring to FIG. 12, the SIC for removing nonlinear components of SI, which was explained in the description of the operation in the data transmission interval, may be performed in the oversampling domain.

First, in the data transmission interval, the transmission signal former 420 may form a transmission signal in advance and transmit the transmission signal, as shown in FIG. 11. Then, the receiving end may perform a DSIC operation.

Then, in the data transmission interval, the output signal of the baseband MIMO transmitter 343 may be defined as $X^{da}$ expressed by Equation 11 below. Here, the output signal of the baseband MIMO transmitter 343 may be input to the SIC controller 400.

$$X^{da}=[x_1^{da}\ldots x_M^{da}]. \quad \text{[Equation 11]}$$

In Equation 11, each of column vectors $x_1^{da}\ldots x_M^{da}$ may refer to each of the first to M-th transmission streams from the baseband MIMO transmitter 343 during the data transmission interval.

The transmission signal former 420 of the SIC controller 400 may form $X^{da}$ using $\hat{D}$ estimated based on Equation 4 as expressed in Equation 12 below (S210).

$$S^{da}=g(\hat{D},X^{da}). \quad \text{[Equation 12]}$$

Then, the basis generator 410 of the SIC controller 400 may receive $S^{da}$, and generate a basis matrix $A^{da}$ for the DSIC. Here, $A^{da}$ may be generated in the same manner as $A_{DSI}^{tr}$ of in Equation 7 and expressed as Equation 13 below (S220).

$$A^{da}=[A_1^{da}A_2^{da}\ldots A_{K_D}^{da}]. \quad \text{[Equation 13]}$$

Then, the RX ADC 323 may convert the analog signal inputted during the data transmission interval and output the converted digital signal to the digital SI canceller 324 (S230). Here, if the output signal of the RX ADC 323 is referred to as $Y^{da}$ during the data transmission interval, $Y^{da}$ may be expressed by Equation 14.

$$Y^{da}=[y_1^{da}\ldots y_M^{da}]. \quad \text{[Equation 14]}$$

In Equation 14, each of column vectors $y_1^{da}\ldots y_M^{da}$ may denote the output of the RX ADC 323 for each of the first to M-th streams during the data transmission interval.

Then, the digital SI canceller 324 may receive the output signal $Y^{da}$ of the RX ADC 323 from the basis generator 410. The digital SI canceller 324 may perform a DSIC operation on $Y^{da}$ as expressed in Equation 15 below by using the estimate $\hat{H}$ of the DSI channel of Equation 9 and $A^{da}$ generated based on Equation 13 (S240).

$$Y^{da}-A^{da}\hat{H}_{DSI} \quad \text{[Equation 15]}$$

Although the operation of the SIC controller 400 according to S110 through S170 and S210 through S240 has been described for the single-channel IFD MIMO transceiver only, the same operation may be applied to the multi-channel IFD MIMO transceiver. In the case that the operations of S110 through S170 and S210 through S240 are applied to the multi-channel IFD MIMO transceiver, each matrix dimension may be doubled in Equations 1 to 15, but the operation of the SIC controller 400 in the training field and the data transmission interval may be performed identically to the case of the single-channel IFD MIMO transceiver.

Figure 13:
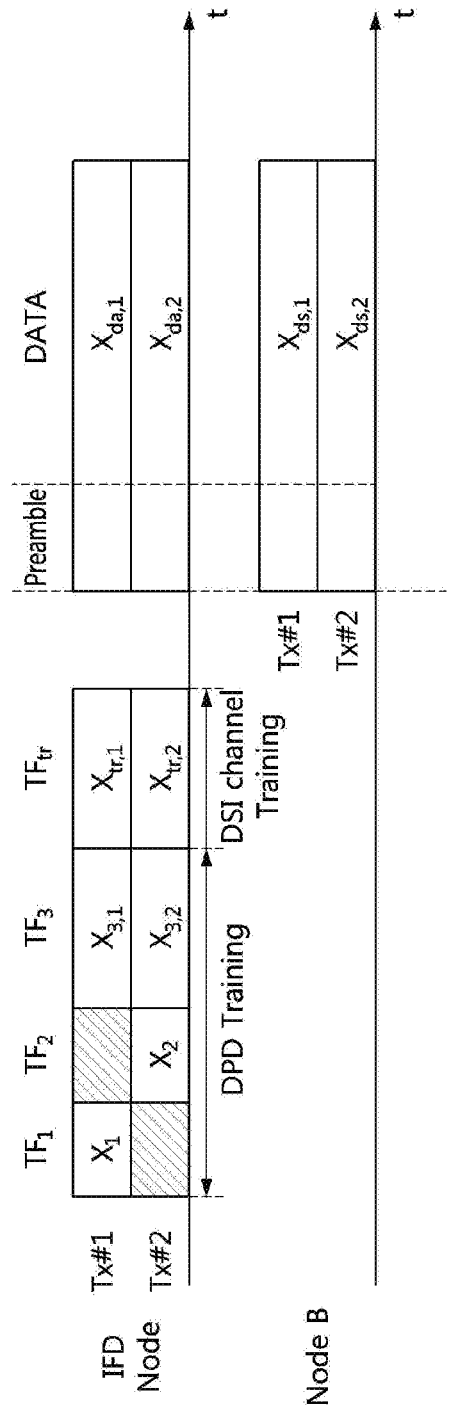
FIG. 13 is a diagram illustrating a detailed structure of a training field for DPD coefficient estimation.

FIG. 13 is a diagram illustrating a detailed structure of a training field for DPD coefficient estimation.

Referring to FIG. 13, an operation example of the transmission signal former 420 during a training field for DPD coefficients and DSI channel estimation is shown.

In the 2-antenna MIMO system including a first antenna and a second antenna, the training field for DPD coefficient estimation may be composed of three training fields to utilize the output signal of the RX ADC 323 as input of a DPD coefficient estimation algorithm.

A first training field $TF_1$ and a second training field $TF_2$ may be intervals operating in the half-duplex (HD) mode. In the first training field $TF_1$, signals may be transmitted only through the first antenna. In the second training field $TF_2$, signals may be transmitted only through the second antenna. Here, the first training field $TF_1$ and the second training field $TF_2$ may be used to compensate for a linear crossover of the antennas and a MIMO channel outside the transceiver. In a third training field $TF_3$, signals may be transmitted using both antennas and may be used to accurately estimate the DPD coefficients.

Meanwhile, if M antennas are arranged in the IFD MIMO transceiver, (M+1) training fields may be configured. In the first training field $TF_1$ through a M-th training field $TF_M$, signals may be transmitted through only each of the first to M-th antennas. In the (M+1)-th training field $TF_{(M+1)}$, signals may be transmitted using all the M antennas.

In the first training field $TF_1$ and the second training field $TF_2$, an arbitrary transmission signal may be used as a pilot signal. In the third training field $TF_3$, a random signal may be used as a pilot signal for accurate DPD coefficient estimation. As described above, the SIC controller 400 of the present disclosure may perform transmission signal shaping without a separate reception chain by using the training field shown in FIG. 13.

In the conventional IFD MIMO transceiver, a digital pre-distortion operation should be performed by loading a signal before being output through an antenna. Therefore, there was a problem of requiring a separate RX branch in addition to an RX branch for data demodulation. On the other hand, the IFD MIMO transceiver according to the present disclosure may not need to arrange a separate RX branch for DPD by sharing the RX branch for data demodulation in the DPD operation. As described above, the IFD MIMO transceiver according to the present disclosure may share a single RX branch for data demodulation and DPD operation, thereby reducing complexity of implementation circuits.

Figure 14:
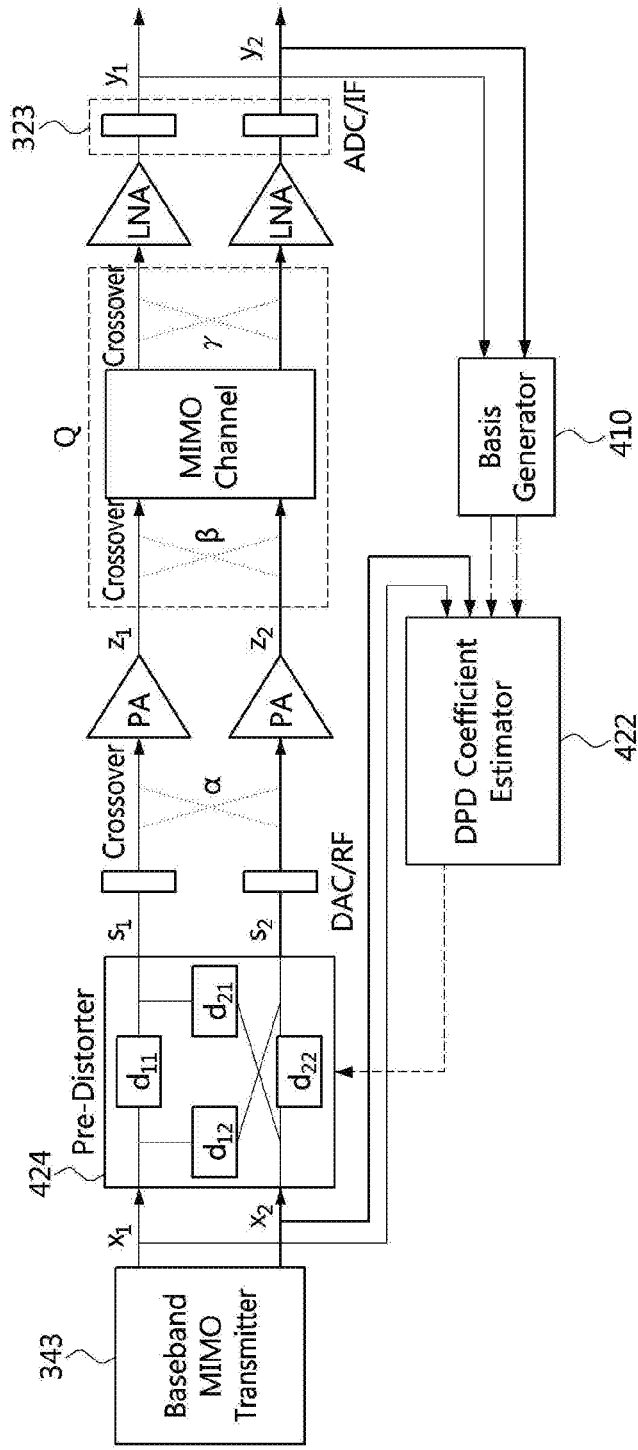
FIG. 14 is a diagram explaining another operation example of a transmission signal former.

FIG. 14 is a diagram explaining another operation example of a transmission signal shaper.

Referring to FIGS. 7 and 14, the operation of the transmission signal former 420 in the SIC controller 400 when the training transmission signal shown in FIG. 13 is used is shown. The output signal of the RX ADC 323 may be input to the basis generator 410. Here, the basis generator 410 may receive only the output signal of the RX ADC 323 as an input. The DPD coefficient estimator 422 may receive the output signal of the baseband MIMO transmitter 343 and the output signal of the basis generator 410 and estimate the DPD coefficients. The DPD coefficients estimated by the DPD coefficient estimator 422 may be supplied to the digital SI generator 434, and the digital SI generator 434 may cause a DSIC operation to be performed using the DPD coefficients.

In FIG. 14, $X_1$ and $X_2$, which are output signals of the baseband MIMO transmitter 343, may indicate outputs of the first and second streams, respectively. Also, the output signals $S_1$ and $S_2$ of the pre-distorter 424 may mean the first stream $X_1$ and the second stream $X_2$ that have passed through the pre-distorter 424. Here, the output signals $S_1$ and $S_2$ of the pre-distorter 424 may be expressed by Equation 16 below.

$$s_1 = d_{11}*x_1 + d_{21}x_2,$$
$$s_2 = d_{12}*x_1 + d_{22}x_2. \quad \text{[Equation 16]}$$

In Equation 16, $d_{ij}$ may be denoted as DPD coefficients used to generate $s_j$ from $x_i$. Here, the DPD coefficients may be defined as $[d_{ij}^1 \; d_{ij}^2 \ldots d_{ij}^{KT}]^T$.

Also, $d_{ij}^k$ may mean a coefficient corresponding to a k-th basis signal of $d_{ij}$ for forming a transmission signal.

Also, the signals that are finally output to the first antenna and the second antenna after $s_1$ and $s_2$ pass through a transmission nonlinear element such as a power amplifier may be defined as $z_1$ and $z_2$. In addition, the output signals obtained after $z_1$ and $z_2$ pass through a channel and the RX ADC 323 of the receiving end may be defined as $y_1$ and $y_2$. The output signals of the RX ADC 323 may be expressed by Equation 17 below.

$$[y_1 \; y_2] = L\left(P\left([z_1 \; z_2]\begin{bmatrix}1 & \alpha \\ \alpha & 1\end{bmatrix}\right)\begin{bmatrix}1 & \beta \\ \beta & 1\end{bmatrix}\begin{bmatrix}h_{11} & h_{12} \\ h_{21} & h_{22}\end{bmatrix}\begin{bmatrix}1 & \gamma \\ \gamma & 1\end{bmatrix}\right) + [n_1 \; n_2] \quad \text{[Equation 17]}$$

$$= L\left(P\left([z_1 \; z_2]\begin{bmatrix}1 & \alpha \\ \alpha & 1\end{bmatrix}\right)Q\right) + [n_1 \; n_2]$$

In Equation (17), $P(\square)$ and $L(\square)$ are functions representing non-linearity of the transmitting end and the receiving end, respectively, and $\gamma$ may denote a crossover occurring in the IFD MIMO transceiver. Also, $n_1$ and $n_2$ may denote a noise vector introduced into the first antenna and the second antenna, respectively. Also, a matrix Q expressing all the crossovers generated in the IFD MIMO transceiver and the MIMO channel may be expressed by Equation 18 below.

$$Q = \begin{bmatrix}q_{11} & q_{12} \\ q_{21} & q_{22}\end{bmatrix} = \begin{bmatrix}1 & \beta \\ \beta & 1\end{bmatrix}\begin{bmatrix}h_{11} & h_{12} \\ h_{21} & h_{22}\end{bmatrix}\begin{bmatrix}1 & \gamma \\ \gamma & 1\end{bmatrix} \quad \text{[Equation 18]}$$

The first training field $TF_1$, the second training field $TF_2$, and the third training field $TF_3$ among the whole training interval of the FIG. 13 may be configured for the DPD coefficient estimation. Here, the first training field $TF_1$ and the second training field $TF_2$ may be for compensating the effect caused by Q of Equation 18, and the third training field $TF_3$ may be for estimating the DPD coefficients $d_{ij}$, i,j=1,2. For this, the transmission signal former 420 may set initial values of the DPD coefficients as shown in Equation 19 below, and the initial values of the DPD coefficients may be maintained during the first training field $TF_1$, the second training field $TF_2$, and the third training field $TF_3$.

$$d_{11}^{ini} = [1,0,\ldots,0]^T,$$
$$d_{12}^{ini} = [0,0,\ldots,0]^T,$$
$$d_{21}^{ini} = [0,0,\ldots,0]^T,$$
$$d_{22}^{ini} = [1,0,\ldots,0]^T. \quad \text{[Equation 19]}$$

Next, the output signals of the baseband MIMO transmitter 343 for the first stream and the second stream in the first training field $TF_1$ of the training field may be respectively defined as $x_1(2)$ and $x_2(2)$. $x_1(1), x_2(1), x_1(2)$, and $x_2(2)$ may be expressed as Equation 20 below.

$$x_1(1) = x_2(2) = x,$$
$$x_1(2) = x_2(1) = 0. \quad \text{[Equation 20]}$$

The transmission signal former 420 may set the initial values of the DPD coefficients as shown in Equations 19 and 20, and use Equation (16) to generate $s_1(1) = s_2(2) = x$ and $s_1(2) = s_2(1) = 0$. When $s_1(1) = s_2(2) = x$ and $s_1(2) = s_2(1) = 0$ are be applied to Equation 17, Equation 21 below may be obtained.

$$\begin{bmatrix}y_1(1) & y_2(1) \\ y_1(2) & y_2(2)\end{bmatrix} = \quad \text{[Equation 21]}$$

$$\begin{bmatrix}L(q_{11}P(x) + q_{12}P(\alpha x)) & L(q_{21}P(x) + q_{22}P(\alpha x)) \\ L(q_{12}P(x) + q_{11}P(\alpha x)) & L(q_{22}P(x) + q_{21}P(\alpha x))\end{bmatrix} + \begin{bmatrix}n_1(1) & n_2(1) \\ n_1(2) & n_2(2)\end{bmatrix}$$

As can be seen from Equation 21, since it is difficult to directly estimate $q_{11}, q_{12}, q_{21}, q_{22}$ due to the nonlinearity of $P(\square)$ and $L(\square)$, Equation 21 may be approximated as Equation 22 below.

$$\begin{bmatrix}y_1(1) & y_2(1) \\ y_1(2) & y_2(2)\end{bmatrix} = Q_D\begin{bmatrix}x & 0 \\ 0 & x\end{bmatrix} = \begin{bmatrix}q_{11}^D & q_{12}^D \\ q_{21}^D & q_{22}^D\end{bmatrix}\begin{bmatrix}x & 0 \\ 0 & x\end{bmatrix} \quad \text{[Equation 22]}$$

In Equation 22, $Q_D$ is a matrix reflecting all the influences of $P(\square), L(\square)$, and Q, and $Q_D$ may be expressed as Equation 23 based on Equation 22.

$$Q_D = \begin{bmatrix}y_1(1) & y_2(1) \\ y_1(2) & y_2(2)\end{bmatrix}\begin{bmatrix}x & 0 \\ 0 & x\end{bmatrix}^{-\dagger} \quad \text{[Equation 23]}$$

The outputs of the baseband MIMO transmitter 343 for the first stream and the second stream in the third training field TF3 may be defined as $x_1(3)$ and $x_2(3)$, and the output signals of the RX ADC 323 for them may be defined as $y_1(3)$ and $y_2(3)$. Here, since all the influences of $P(\square), L(\square)$, and Q are reflected in $y_1(3)$ and $y_2(3)$, they may be canceled as shown in Equation 24 below.

$$[\tilde{y}_1(3)\tilde{y}_2(3)]^T = Q_D^\dagger [y_1(3)y_2(3)]^T \quad \text{[Equation 24]}$$

The transmission signal former 420 may calculate the DPD coefficients to be used thereafter by using $\tilde{y}_1(3)$ and $\tilde{y}_2(3)$ of Equation 24 as shown in Equation 25 below.

$$\begin{bmatrix}d_{11} & d_{21} \\ d_{12} & d_{22}\end{bmatrix} = ([A_{\tilde{y}_1(3)} \; A_{\tilde{y}_2(3)}])^\dagger [x_1(3) \; x_2(3)] \quad \text{[Equation 25]}$$

In Equation 25, $A_{\tilde{y}_1(3)}$ and $A_{\tilde{y}_2(3)}$ are basis matrices by the basis generator 410 using $\tilde{y}_1(3)$ and $\tilde{y}_2(3)$.

Hereinafter, a method of generating a basis matrix that can be used in Equations 3, 4, 7, 13, and 25 described above will be described.

First, the output signal of the baseband MIMO transmitter 343 may be defined as S which is expressed by Equation 26 below.

$$S = [s_1 \ldots s_M]. \quad \text{[Equation 26]}$$

In Equation 26, each of column vectors $s_1 \ldots s_M$ may be a vector representing each of the transmission signals transmitted in the first to M-th streams.

Then, the basis generator 410 may receive S of Equation 26, and generate a basis matrix A. The basis matrix A is a matrix into which a plurality of toeplitz matrices are combined, and may be expressed by Equation 27 below.

$$A = [A_1 A_2 \ldots A_{u(M,K)}].\qquad\text{[Equation 27]}$$

In Equation 27, K may mean the maximum order of nonlinear components generated by the basis generator 410. Also, u(M,K) may denote the total number of basic signals generated by the basis generator 410. Here, the value of u(M,K) may be expressed by Equation 28.

$$u(M, K) = \sum_{k=1}^{K} \binom{2M + (2k-1) - 1}{2M - 1} \qquad\text{[Equation 28]}$$

Then, in Equation 27, each $A_i$ may be expressed as Equation 29 below.

$$A_i = \begin{bmatrix} w_i[\max(1, 1 - N_{end}) + N] & \cdots & w_i[\max(1, 1 - N_{end})] \\ \vdots & \ddots & \vdots \\ w_i[\min(L, L - N_{begin})] & \cdots & w_i[\min(L, L - N_{begin}) - N] \end{bmatrix} \qquad\text{[Equation 29]}$$

In Equation 29, L may be a sample length of the output signal of the baseband MIMO transmitter 343. Here, the sample length may mean the number of Tx samples used to generate the basis.

Also, $N_{begin}$ and $N_{end}$ may be a minimum delay and a maximum delay of a window processing $S_1 \ldots s_M$ to generate $A_i$. Here, the window may mean a range of Tx sample delays considered to produce $A_i$ in equation 29. In some cases, not only causal delay but also non-causal delay may be used, so that $A_i$ can be generated by setting the length of the window. For example, when the length of the window is 4, $N_{begin}$ is −2, and $N_{end}$ is 1, $A_i$ can be generated using s(t+1), s(t), s(t−1), s(t−2), s(t−3) at t.

Also, $N = N_{end} - N_{begin}$ may mean a value of (memory length −1). Here, the memory length may mean a delay length of the Tx samples considered to generate the toeplitz matrix denoted as $A_i$ in equation 29. For example, if the memory length is 3, $A_i$ may be generated using s(t), s(t−1), s(t−2), and s(t−3).

Table 1 shows an example of the bases generated by the basis generator 410 of the present disclosure and shows an example of bases that can be applied to $W_i$ in Equation 29. Table 1 shows the basic signals in the case of M=2 (M is the number of antennas). That is, if i=24, $W_{24} = S^*_2 S^*_2 S^*_2$ may be used to generate $A_{24}$. The method of generating a basis in the present disclosure is not limited to the example described in Table 1, and Table 1 shows only an example of various examples of the bases.

TABLE 1

| $W_i$ in Equation 29 generation equation | $W_1$ $S_1$ | $W_2$ $S_1^*$ | $W_3$ $S_2$ | $W_4$ $S_2^*$ |
|---|---|---|---|---|
| $W_i$ in Equation 29 generation equation | $W_5$ $S_1 S_1 S_1$ | $W_6$ $S_1 S_1 S_1^*$ | $W_7$ $S_1 S_1 S_2$ | $W_8$ $S_1 S_1 S_2^*$ |
| $W_i$ in Equation 29 generation equation | $W_9$ $S_1 S_1^* S_1^*$ | $W_{10}$ $S_1 S_1^* S_2$ | $W_{11}$ $S_1 S_1^* S_2^*$ | $W_{12}$ $S_1 S_2 S_2$ |

TABLE 1-continued

| $W_i$ in Equation 29 generation equation | $W_{13}$ $S_1 S_1 S_2^*$ | $W_{14}$ $S_1 S_2^* S_2^*$ | $W_{15}$ $S_1^* S_1^* S_1^*$ | $W_{16}$ $S_1^* S_1^* S_2$ |
|---|---|---|---|---|
| $W_i$ in Equation 29 generation equation | $W_{17}$ $S_1^* S_1^* S_2^*$ | $W_{18}$ $S_1^* S_2 S_2$ | $W_{19}$ $S_1^* S_2 S_2^*$ | $W_{20}$ $S_1^* S_2^* S_2^*$ |
| $W_i$ in Equation 29 generation equation | $W_{21}$ $S_2 S_2 S_2$ | $W_{22}$ $S_2 S_2 S_2^*$ | $W_{23}$ $S_2 S_2^* S_2^*$ | $W_{24}$ $S_2^* S_2^* S_2^*$ |

When crosstalk occurs between antennas in an IFD MIMO transceiver, the order of a basis required for accurately modeling the nonlinearity SI is increased, and the channels of SI (coefficients corresponding to each basis) increase exponentially. In the IFD MIMO transceiver according to the embodiment of the present disclosure, the nonlinearity SI generated at the transmitting end may be cancelled at the transmitting end, and the nonlinearity SI generated at the receiving end may be cancelled at the receiving end. This may reduce the complexity of digital SIC by performing a low order DPD and a low order DSIC instead of performing a high order DSIC once.

In particular, in the multi-channel IFD MIMO transceiver, if the adjacent channels are stuck together on the frequency axis, the nonlinearity of the SI, which is caused by the crosstalk between the antennas in each channel, will interfere with the adjacent channel, and increase the burden of SIC. The IFD MIMO transceiver according to the embodiment of the present disclosure can preliminarily linearize and transmit a transmission signal, thereby minimizing interference between adjacent channels, thereby reducing the burden on the DSIC design of the receiving end.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of an in-band full duplex (IFD) multiple-input multiple-output (MIMO) transceiver including a reception part, a transmission part, an analog self-interference (SI) generator, and a self-interference cancellation (SIC) controller, the operation method comprising:
   receiving, at the SIC controller, a signal for transmission signal forming;
   generating, at the SIC controller, a control signal for analog SIC and digital SIC and outputting the control signal to the reception part and the analog SI generator;

cancelling, at the SIC controller, SI of a transmission signal of the transmission part based on the control signal and the signal for the transmission signal forming; and cancelling, at the reception part, SI of a signal of the reception part based on the control signal, wherein, the signal for the transmission signal forming is an oversampled signal of the transmission signal.

2. The operation method according to claim 1, wherein the signal for the transmission signal forming is generated by a baseband MIMO transmitter in the transmission part.

3. The operation method according to claim 2, wherein the cancelling at the SIC controller further comprises forming, at the SIC controller, the transmission signal of the transmission part and outputting the formed transmission signal to a transmission (TX) digital-to-analog converter (DAC) in the transmission part.

4. The operation method according to claim 1, wherein the SIC controller outputs the control signal to a digital SI canceller in the reception part.

5. The operation method according to claim 4, wherein the digital SI canceller cancels SI from the signal of the reception part based on the control signal.

6. The operation method according to claim 5, further comprising outputting, at the digital SI canceller, the signal of the reception part from which the SI has been cancelled to a baseband MIMO receiver in the reception part.

7. An operation method of an in-band full duplex (IFD) multiple-input multiple-output (MIMO) transceiver including a reception part, a transmission part, an analog self-interference (SI) generator, and a self-interference cancellation (SIC) controller, the operation method comprising:

generating, at the SIC controller, a control signal for analog SIC and digital SIC and outputting the control signal to the reception part and the analog SI generator;

cancelling, at the SIC controller, SI of a transmission signal of the transmission part based on the control signal; and cancelling, at the reception part, SI of a signal of the reception part based on the control signal, wherein the control signal is generated based on an output signal of the analog SI generator and an output signal of a reception (RX) analog-to-digital converter (ADC) in the reception part.

* * * * *